US012684417B2

(12) United States Patent
Höykinpuro

(10) Patent No.: US 12,684,417 B2
(45) Date of Patent: Jul. 14, 2026

(54) METHOD FOR CONTROLLING CALL CAPACITY IN A MOBILE NETWORK

(71) Applicant: Elisa Oyj, Helsinki (FI)

(72) Inventor: Veijo Höykinpuro, Helsinki (FI)

(73) Assignee: ELISA OYJ, Helsinki (FI)

( * ) Notice: Subject to any disclaimer, the term of this patent is extended or adjusted under 35 U.S.C. 154(b) by 335 days.

(21) Appl. No.: 18/278,288

(22) PCT Filed: Feb. 28, 2022

(86) PCT No.: PCT/FI2022/050128
§ 371 (c)(1),
(2) Date: Aug. 22, 2023

(87) PCT Pub. No.: WO2022/184976
PCT Pub. Date: Sep. 9, 2022

(65) Prior Publication Data
US 2024/0129800 A1 Apr. 18, 2024

(30) Foreign Application Priority Data
Mar. 2, 2021 (FI) ...................................... 20215224

(51) Int. Cl.
*H04W 28/08* (2023.01)
*H04W 28/086* (2023.01)
(Continued)

(52) U.S. Cl.
CPC ... *H04W 28/0925* (2020.05); *H04W 28/0835* (2020.05); *H04W 28/0862* (2023.05);
(Continued)

(58) Field of Classification Search
CPC .... H04L 5/0058; H04L 5/0094; H04W 72/52; H04W 72/1268; H04W 24/04;
(Continued)

(56) References Cited

U.S. PATENT DOCUMENTS 8,886,209 B2 * 11/2014 Shaw ..................... H04W 36/22
455/435.3
9,071,466 B2 * 6/2015 Bae .......................... H04L 12/66
(Continued)

FOREIGN PATENT DOCUMENTS

EP 2958365 A1 12/2015
WO 2015175135 A1 11/2015

OTHER PUBLICATIONS

European Patent Office, International Search Report and Written Opinion of the International Searching Authority, Application No. PCT/FI2022/050128, mailed Jun. 24, 2022, 14 pages.
(Continued)

*Primary Examiner* — Jung Liu
(74) *Attorney, Agent, or Firm* — Ziegler IP Law Group LLC.

(57) ABSTRACT
A computer implemented method for controlling call capacity in a mobile network. The method includes: activating a mass event mode in a first cell of a first base station, wherein the first cell is a high frequency band cell, and wherein operating in the mass event mode comprises: checking if any low frequency band cells are available in a first sector served by the first cell; and responsive to detecting that one or more low frequency band cells are available, switching, at least some, voice call connections of the users of the first cell to at least some of the available low frequency band cells.

17 Claims, 4 Drawing Sheets

(51) Int. Cl.
    *H04W 36/00*         (2009.01)
    *H04W 36/14*         (2009.01)

(52) U.S. Cl.
    CPC ..... *H04W 36/00* (2013.01); *H04W 36/00224*
              (2023.05); *H04W 36/14* (2013.01)

(58) Field of Classification Search
    CPC ..... H04W 88/08; H04W 72/53; H04W 16/24;
           H04W 48/16; H04W 4/029; H04W 24/10;
           H04W 24/02; H04W 88/06; G01S 19/51;
                                H04B 17/318
    See application file for complete search history.

(56)              References Cited

U.S. PATENT DOCUMENTS

| | | | | |
|---|---|---|---|---|
| 9,888,423 | B2 * | 2/2018 | Su | H04W 36/00224 |
| 10,681,559 | B2 * | 6/2020 | Zhu | H04W 68/005 |
| 11,190,993 | B2 * | 11/2021 | Shi | H04W 48/16 |
| 11,743,855 | B2 * | 8/2023 | Albasheir | H04W 28/0846 |
| | | | | 455/435.1 |
| 11,930,427 | B2 * | 3/2024 | Naik | H04L 65/1069 |
| 12,192,753 | B2 * | 1/2025 | Zaus | H04W 36/0005 |
| 2004/0022366 | A1 * | 2/2004 | Ferguson | H04Q 3/0091 |
| | | | | 379/1.01 |
| 2014/0162661 | A1 * | 6/2014 | Shaw | H04W 36/22 |
| | | | | 455/439 |
| 2016/0353330 | A1 * | 12/2016 | Naik | H04L 65/1016 |
| 2017/0013513 | A1 * | 1/2017 | Agarwal | H04W 36/22 |
| 2017/0064605 | A1 * | 3/2017 | Wang | H04W 76/18 |
| 2018/0176819 | A1 * | 6/2018 | Papa | H04W 28/0247 |
| 2019/0208564 | A1 * | 7/2019 | Peng | H04W 24/04 |
| 2020/0112892 | A1 * | 4/2020 | Shi | H04W 36/0079 |
| 2020/0252838 | A1 * | 8/2020 | Akdeniz | H04W 36/0061 |
| 2020/0252849 | A1 * | 8/2020 | Tang | H04W 36/1443 |
| 2021/0051530 | A1 * | 2/2021 | Venkataraman | H04W 76/12 |
| 2021/0219203 | A1 * | 7/2021 | Agarwal | H04W 24/02 |
| 2022/0086679 | A1 * | 3/2022 | Briggs | H04W 72/543 |
| 2022/0159525 | A1 * | 5/2022 | Chou | H04W 36/0058 |
| 2022/0191735 | A1 * | 6/2022 | Yadav | H04W 68/04 |
| 2022/0256394 | A1 * | 8/2022 | Briggs | H04L 65/403 |
| 2023/0132875 | A1 * | 5/2023 | Jia | H04W 28/0268 |
| | | | | 455/435.2 |
| 2023/0156527 | A1 * | 5/2023 | Zhang | H04L 65/1016 |
| 2023/0164611 | A1 * | 5/2023 | Chiang | H04W 16/24 |
| | | | | 370/252 |
| 2023/0188574 | A1 * | 6/2023 | Keller | H04L 65/1069 |
| | | | | 370/352 |
| 2023/0262698 | A1 * | 8/2023 | Yoo | H04L 5/0058 |
| | | | | 370/228 |
| 2023/0413382 | A1 * | 12/2023 | Totadamane Ramappa | H04W 76/50 |
| 2025/0142509 | A1 * | 5/2025 | Zaus | H04L 65/1016 |

OTHER PUBLICATIONS

Finnish Patent and Registration Office, Search Report, Application No. 20215224, mailed Nov. 1, 2021, 2 pages.

* cited by examiner

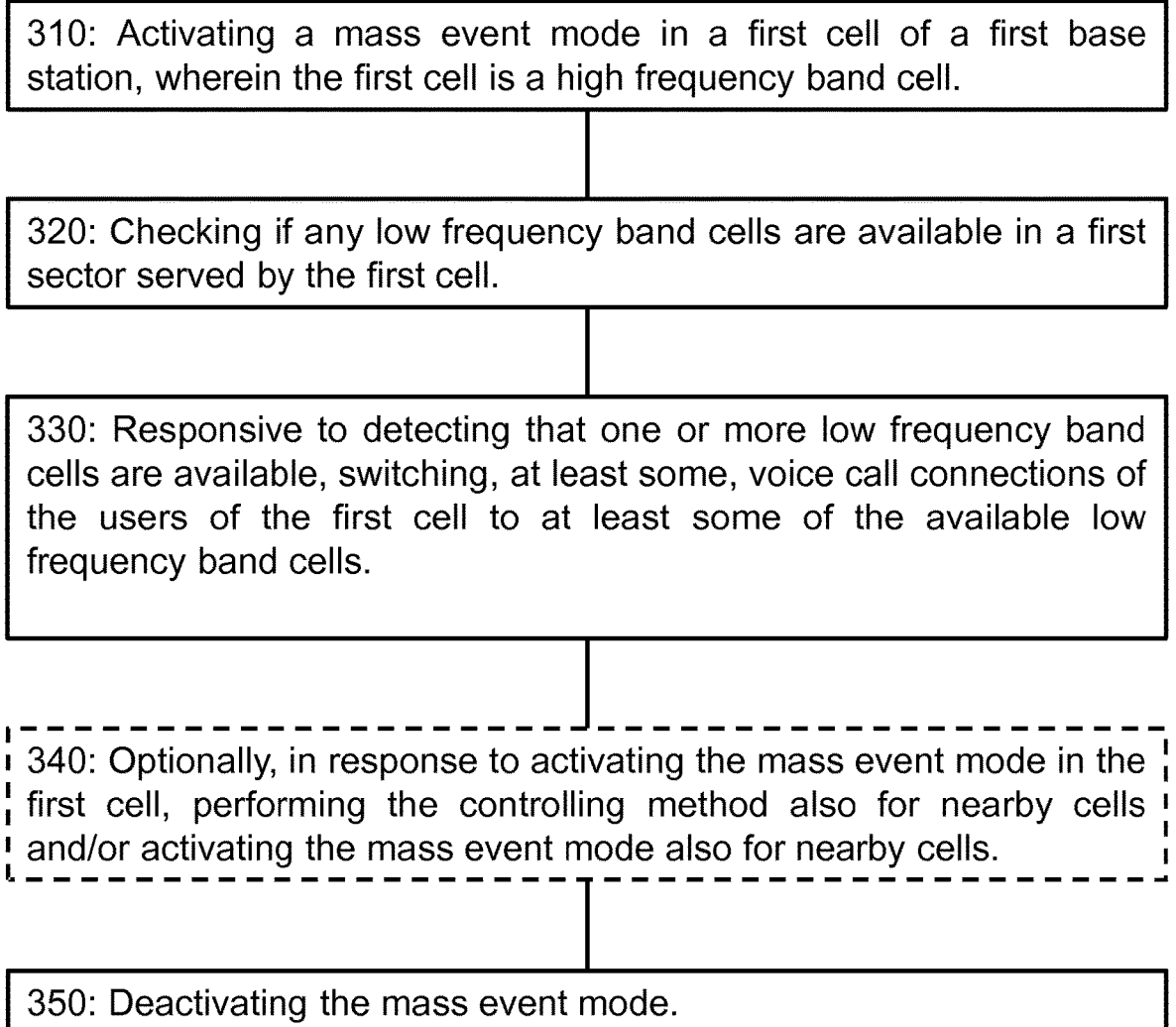

310: Activating a mass event mode in a first cell of a first base station, wherein the first cell is a high frequency band cell.

320: Checking if any low frequency band cells are available in a first sector served by the first cell.

330: Responsive to detecting that one or more low frequency band cells are available, switching, at least some, voice call connections of the users of the first cell to at least some of the available low frequency band cells.

340: Optionally, in response to activating the mass event mode in the first cell, performing the controlling method also for nearby cells and/or activating the mass event mode also for nearby cells.

350: Deactivating the mass event mode.

Fig. 3

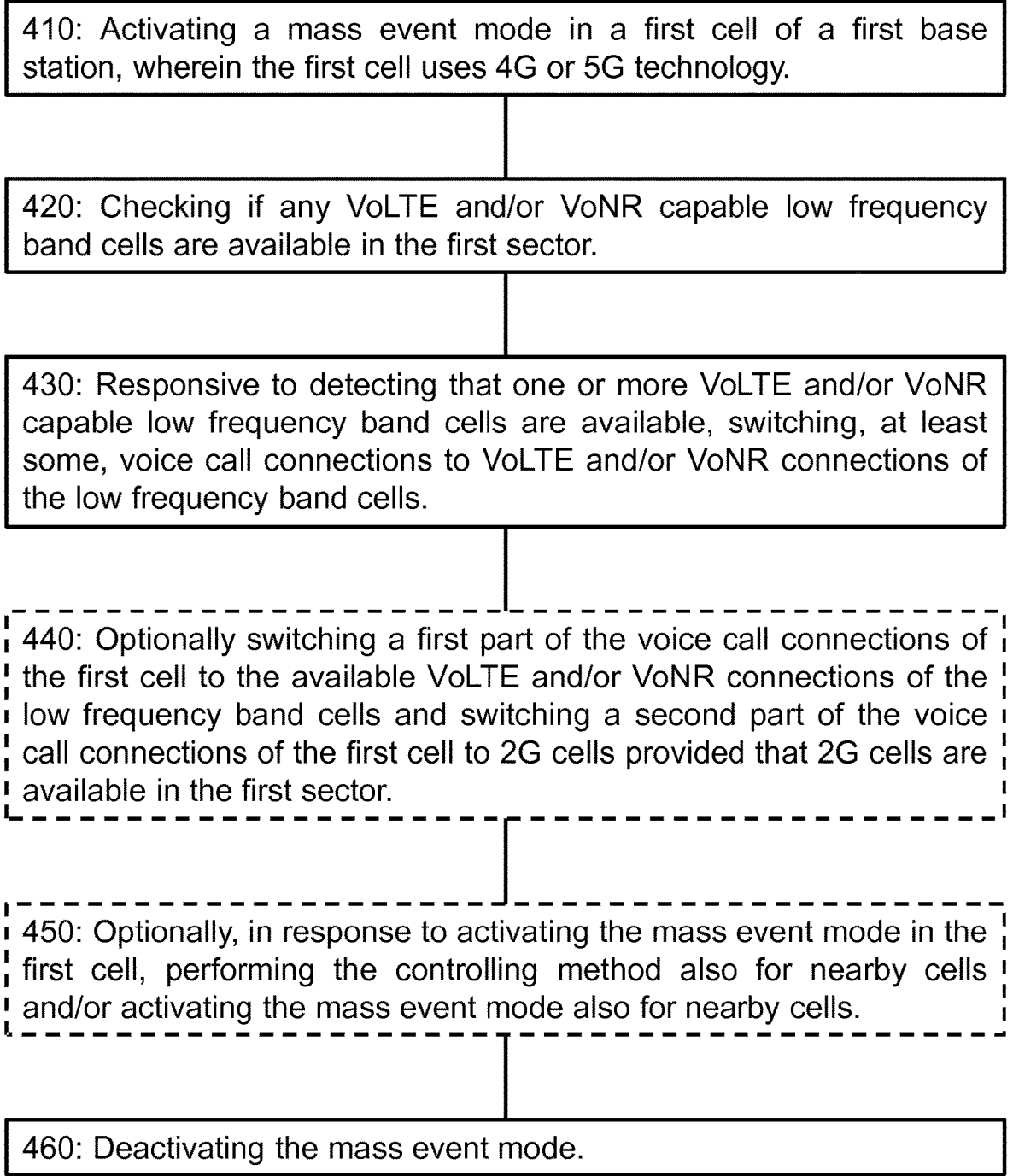

410: Activating a mass event mode in a first cell of a first base station, wherein the first cell uses 4G or 5G technology.

420: Checking if any VoLTE and/or VoNR capable low frequency band cells are available in the first sector.

430: Responsive to detecting that one or more VoLTE and/or VoNR capable low frequency band cells are available, switching, at least some, voice call connections to VoLTE and/or VoNR connections of the low frequency band cells.

440: Optionally switching a first part of the voice call connections of the first cell to the available VoLTE and/or VoNR connections of the low frequency band cells and switching a second part of the voice call connections of the first cell to 2G cells provided that 2G cells are available in the first sector.

450: Optionally, in response to activating the mass event mode in the first cell, performing the controlling method also for nearby cells and/or activating the mass event mode also for nearby cells.

460: Deactivating the mass event mode.

Fig. 4

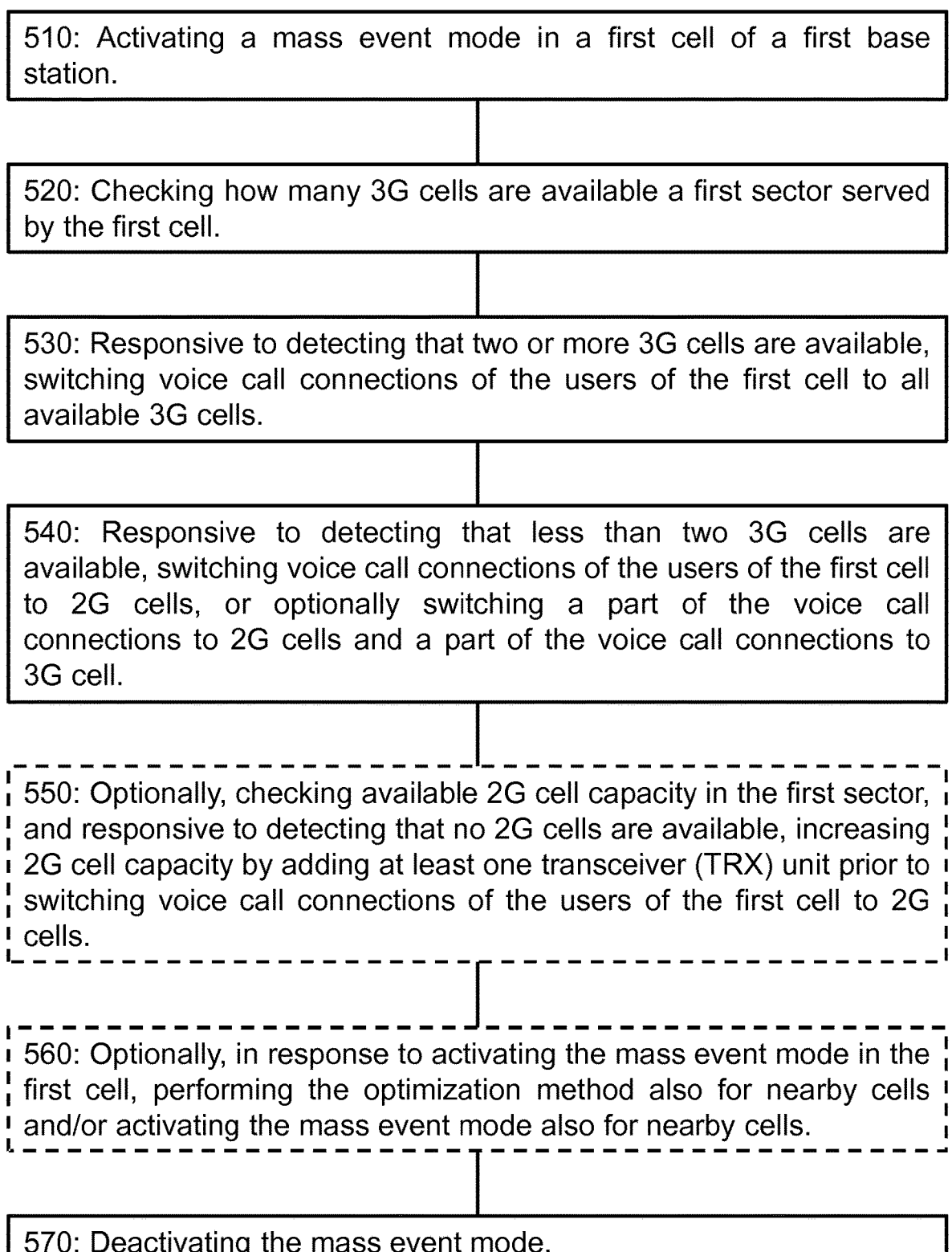

510: Activating a mass event mode in a first cell of a first base station.

520: Checking how many 3G cells are available a first sector served by the first cell.

530: Responsive to detecting that two or more 3G cells are available, switching voice call connections of the users of the first cell to all available 3G cells.

540: Responsive to detecting that less than two 3G cells are available, switching voice call connections of the users of the first cell to 2G cells, or optionally switching a part of the voice call connections to 2G cells and a part of the voice call connections to 3G cell.

550: Optionally, checking available 2G cell capacity in the first sector, and responsive to detecting that no 2G cells are available, increasing 2G cell capacity by adding at least one transceiver (TRX) unit prior to switching voice call connections of the users of the first cell to 2G cells.

560: Optionally, in response to activating the mass event mode in the first cell, performing the optimization method also for nearby cells and/or activating the mass event mode also for nearby cells.

570: Deactivating the mass event mode.

Fig. 5

METHOD FOR CONTROLLING CALL CAPACITY IN A MOBILE NETWORK

TECHNICAL FIELD

The present disclosure generally relates to controlling call capacity in a mobile network. The disclosure relates particularly, though not exclusively, to managing call capacity in high traffic situation.

BACKGROUND

This section illustrates useful background information without admission of any technique described herein representative of the state of the art.

During mass events, there is often temporary increase in mobile network load. For example, load caused by call connections may be significantly higher than normally. In such situation there is a problem of adapting mobile network so that it can manage the increased load.

The present disclosure provides a solution to the above problem.

SUMMARY

The appended claims define the scope of protection. Any examples and technical descriptions of apparatuses, products and/or methods in the description and/or drawings not covered by the claims are presented not as embodiments of the present disclosure but as background art or examples useful for understanding the present disclosure.

According to a first example aspect of the present disclosure, there is provided computer implemented method for controlling call capacity in a mobile network. The method comprises: activating a mass event mode in a first cell of a first base station, wherein the first cell is a high frequency band cell, and wherein operating in the mass event mode comprises: checking if any low frequency band cells are available in a first sector served by the first cell; and responsive to detecting that one or more low frequency band cells are available, switching, at least some, voice call connections of the users of the first cell to at least some of the available low frequency band cells.

In an embodiment, the low frequency band comprises frequencies below or equal to 1000 MHz, and the high frequency band comprises frequencies over 1000 MHz.

In an embodiment, the low frequency band comprises frequencies 700-900 MHz, and the high frequency band comprises frequencies equal to or over 1800 MHz.

In an embodiment, the first cell uses 4G or 5G technology and the method further comprises:

checking if any low frequency band cells are available in the first sector served by the first cell comprises: checking if any VoLTE and/or VoNR capable low frequency band cells are available in the first sector; and responsive to detecting that one or more low frequency band cells are available, switching, at least some, voice call connections of the users of the first cell to at least some of the available low frequency band cells comprises: responsive to detecting that one or more VoLTE and/or VoNR capable low frequency band cells are available, switching, at least some, voice call connections to VoLTE and/or VoNR connections of the low frequency band cells; or optionally switching a first part of the voice call connections of the first cell to the available VoLTE and/or VoNR connections of the low frequency band cells and a second part of the voice call connections of the first cell to 2G cells.

In an embodiment, the first cell uses 4G or 5G technology and the method further comprises:

checking if any low frequency band cells are available in the first sector served by the first cell comprises: checking how many 3G cells are available in the first sector; and responsive to detecting that one or more low frequency band cells are available, switching, at least some, voice call connections of the users of the first cell to at least some of the available low frequency band cells comprises: responsive to detecting that two or more 3G cell are available, switching, at least some, voice call connections of the users of the first cell to at least some of the available 3G cells; and responsive to detecting that less than two 3G cells are available, switching voice call connections of the users of the first cell to 2G cells; or optionally switching a first part of the voice call connections of the first cell to the available 3G cells and a second part of the voice call connections of the first cell to 2G cells.

In an embodiment, switching voice call connections of the users of the first cell to 2G cells comprises: checking available 2G cell capacity in the first sector; and responsive to detecting that no 2G cells are available, increasing 2G cell capacity by adding at least one transceiver unit prior to switching voice call connections of the users of the first cell to 2G cells.

In an embodiment, the voice call connections are switched to the available 2G cells only if at least 2 or 3 or 4 2G cells are available.

In an embodiment, the method further comprises disabling inter system handover of voice call connections from 2G technology to other technologies when operating in the mass event mode; and/or disabling inter system handover of voice call connections from 2G technology to 3G technology when operating in the mass event mode; and/or disabling inter system handover of voice call connections from 3G technology to 4G and/or 5G technologies when operating in the mass event mode.

In an embodiment, in response to activating the mass event mode in the first cell, activating a mass event mode also in: other high frequency band cells of the first base station; and/or high frequency band cells of neighbouring base stations; and/or high frequency band cells serving a selected area; and/or high frequency band cells of base stations in a selected area.

In an embodiment, the mass event mode is activated in response to detecting that: a count of users of the first cell exceeds a pre-set activation threshold; a pre-set activation time occurs; or a mass event mode is activated in a nearby cell.

In an embodiment, the mass event mode is deactivated in response to detecting that: the count of users in the first cell subceeds a pre-set deactivation threshold for a pre-set duration; or a pre-set termination time occurs.

In an embodiment, the pre-set activation threshold is 100-500.

In an embodiment, the pre-set deactivation threshold is smaller than or equal to the pre-set activation threshold and the pre-set duration is 0.5-2 days.

According to a second example aspect of the present disclosure, there is provided an apparatus comprising a processor and a memory including computer program code; the memory and the computer program code configured to, with the processor, cause the apparatus to perform the method of the first aspect or any related embodiment.

According to a third example aspect there is provided a computer program comprising computer executable program code which when executed by at least one processor causes an apparatus at least to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of any preceding aspect.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIG. 3 shows a flow chart according to an example embodiment;

FIG. 4 shows a flow chart according to an example embodiment; and

FIG. 5 shows a flow chart according to an example embodiment.

DETAILED DESCRIPTION

In the following description, like reference signs denote like elements or steps.

During mass events, the terminals cause considerable load on the 3G network, because a large part of the voice calls still go on the 3G network, even if large part of terminals are 4G or 5G capable. It may not be possible to increase the capacity of 3G because the frequencies are allocated to 4G (or long term evolution, LTE) or to 5G (or new radio, NR). Because 3G capacity has been reduced and there is mainly only one frequency in use, the 3G capacity is easily congested during mass events. The embodiments of the present disclosure provide solutions for controlling call capacity during increased load.

Figure 1:
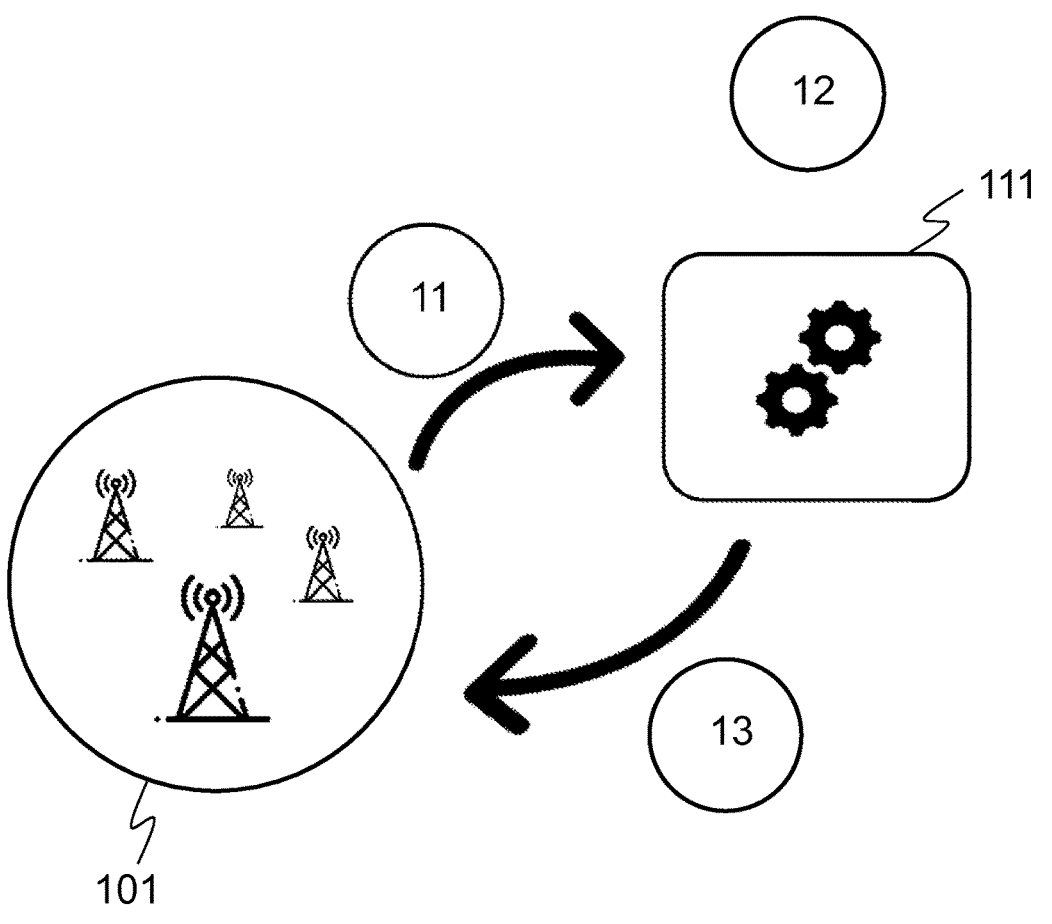
FIG. 1 shows an example scenario according to an embodiment.

FIG. 1 shows an example scenario according to an embodiment. The scenario shows a mobile network 101 comprising a plurality of cells and base station sites and other network devices, and an automated system 111 configured for controlling call capacity in the mobile network.

In an embodiment of the present disclosure the scenario of FIG. 1 operates as follows: In phase 11, the automated system 111 receives data related to a network. The data may be obtained from the network and/or from a data storage. The received data may comprise user counts of cells of the network and network configuration data. The network configuration data may comprise network topology information, used cell technologies and frequencies, sector configuration of base stations, and neighbour information. Other network related data may also be comprised.

In phase 12, the automated system 111 checks a count of users of a first cell and activates a mass event mode if required. Alternatively or additionally, mass event activation and deactivation times may be set manually. The first cell is a high frequency band cell. The high frequency band may comprise frequencies over 1000 MHz, preferably frequencies over 1800 MHz. In some example embodiments, the first cell may use 4G or 5G technology or some subsequently developed technology. The automated system may also check if low frequency band cells are available in a service area of the first cell. The low frequency band may comprise frequencies below 1000 MHz, preferably frequency band 700-900 MHz. In some example embodiment, the low frequency band cells comprise 3G and/or 2G technology cells. In some example embodiments, the low frequency band cells comprise cells with voice call capabilities. In some example embodiments, the low frequency band cells comprise cells with voice over LTE (VoLTE) and/or voice over NR (VoNR) capability. In some example embodiments, the low frequency band cells are 3G cells replaced with low frequency band LTE and/or NR cells. In some example embodiments, the low frequency band cells comprise VoLTE and/or VoNR capable cell(s) and 2G cell(s).

In phase 13, the automated system 111 may, in the mass event mode, switch at least some of the users of the first cell starting a voice call to available low frequency band cells. The mass event mode is deactivated when it is not required any more. Deactivation may be based on user count and/or time.

Figure 2:
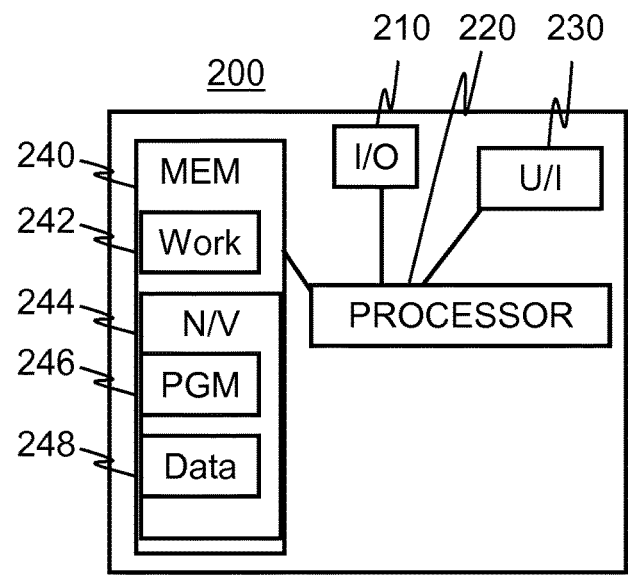
FIG. 2 shows a block diagram of an apparatus according to an example embodiment.

FIG. 2 shows a block diagram of an apparatus 200 according to an example embodiment. The apparatus 200 comprises a communication interface 210; a processor 220; a user interface 230; and a memory 240. The apparatus 200 can be used for implementing at least some embodiments of the present disclosure. That is, with suitable configuration the apparatus 200 is suited for operating for example as the automated system 111.

The communication interface 210 comprises in an embodiment a wired and/or wireless communication circuitry, such as Ethernet; Wireless LAN; Bluetooth; GSM; CDMA; WCDMA; LTE; and/or 5G circuitry. The communication interface can be integrated in the apparatus 200 or provided as a part of an adapter, card or the like, that is attachable to the apparatus 200. The communication interface 210 may support one or more different communication technologies. The apparatus 200 may also or alternatively comprise more than one of the communication interfaces 210.

In this document, a processor may refer to a central processing unit (CPU); a microprocessor; a digital signal processor (DSP); a graphics processing unit; an application specific integrated circuit (ASIC); a field programmable gate array; a microcontroller; or a combination of such elements.

The user interface may comprise a circuitry for receiving input from a user of the apparatus 200, e.g., via a keyboard; graphical user interface shown on the display of the apparatus 200; speech recognition circuitry; or an accessory device; such as a headset; and for providing output to the user via, e.g., a graphical user interface or a loudspeaker.

The memory 240 comprises a work memory 242 and a persistent memory 244 configured to store computer program code 246 and data 248. The memory 240 may comprise any one or more of: a read-only memory (ROM); a programmable read-only memory (PROM); an erasable programmable read-only memory (EPROM); a random-access memory (RAM); a flash memory; a data disk; an optical storage; a magnetic storage; a smart card; a solid-state drive (SSD); or the like. The apparatus 200 may comprise a plurality of the memories 240. The memory 240 may be constructed as a part of the apparatus 200 or as an attachment to be inserted into a slot; port; or the like of the apparatus 200 by a user or by another person or by a robot. The memory 240 may serve the sole purpose of storing data, or be constructed as a part of an apparatus 200 serving other purposes, such as processing data.

A skilled person appreciates that in addition to the elements shown in FIG. 2, the apparatus 200 may comprise other elements, such as microphones; displays; as well as additional circuitry such as input/output (I/O) circuitry; memory chips; application-specific integrated circuits (ASIC); processing circuitry for specific purposes such as source coding/decoding circuitry; channel coding/decoding circuitry; ciphering/deciphering circuitry; and the like. Additionally, the apparatus 200 may comprise a disposable or rechargeable battery (not shown) for powering the apparatus 200 if external power supply is not available.

FIG. 3 shows a flow chart according to an example embodiment. FIG. 3 illustrates a computer implemented method for controlling call capacity in a mobile network comprising various possible process steps including some optional steps while also further steps can be included and/or some of the steps can be performed more than once:

310: Activating a mass event mode in a first cell of a first base station. The first cell is a high frequency band cell operating in a frequency band comprising frequencies above 1000 MHz. In an embodiment, the first cell operates in a frequency band comprising frequencies equal to or above 1800 MHz. In the mass event mode, method steps 320-350 may be performed.

In an embodiment, the mass event mode is activated in response to detecting that a count of users of the first cell exceeds a pre-set activation threshold. In an embodiment, the mass event mode is activated in response to detecting that a pre-set activation time occurs. In an embodiment, the mass event mode is activated in response to detecting that a mass event mode is activated in a nearby cell.

In an example embodiment, the pre-set activation threshold is 100-500, preferably 200, 300, or 400. In an example embodiment, the count of users is determined based on number of users that are active (e.g., users that have an active connection) in the first cell. In a further embodiment, the users connected to the first cell that are considered in the count of users are radio resource control (RRC) connected users.

320: Checking if any low frequency band cells are available in a first sector served by the first cell. Low frequency band cells operate in a frequency band comprising frequencies below 1000 MhZ. In an embodiment, the low frequency band cells operate in a frequency band comprising frequencies 700-900 MhZ.

330: Responsive to detecting that one or more low frequency band cells are available, switching, at least some, voice call connections of the users of the first cell to at least some of the available low frequency band cells. By switching the voice call connections to the low frequency band cells, one achieves that the high frequency band cells may continue to provide high speed data connections while voice call connections are served by low frequency cells. Low frequency band cells suit well for voice call connections as voice call connections may not require very high transmission speeds and low frequency band cells have better coverage. For voice call connections, it is more important to obtain continuous transmission.

340: Optionally, in response to activating the mass event mode in the first cell, performing the controlling method also for nearby cells and/or activating the mass event mode also for nearby cells. In an example embodiment, the controlling method is performed also for: other high frequency band cells of the first base station; and/or high frequency band cells of neighboring base stations; and/or high frequency band cells serving a selected area; and/or high frequency band cells of base stations in a selected area. In an example embodiment, the mass event mode is activated also in: other high frequency band cells of the first base station; and/or high frequency band cells of neighboring base stations; and/or high frequency band cells serving a selected area; and/or high frequency band cells of base stations in a selected area.

350: Deactivating the mass event mode. In an embodiment, the mass event mode is deactivated in response to detecting that the count of users in the first cell subceeds a pre-set deactivation threshold for a pre-set duration. In an embodiment, the mass event mode is deactivated in response to detecting that a pre-set termination time occurs.

In an example embodiment, the pre-set deactivation threshold is smaller than or equal to the pre-set activation threshold. In an example embodiment, the pre-set duration is 0.5-1 day. In an example embodiment, the pre-set termination time may be 0.5-2 days, or 1-3 days, or 4 days.

FIG. 4 shows a flow chart according to an example embodiment. In the example embodiment of FIG. 4, the method of FIG. 3 is applied in a case wherein a first cell uses 4G or 5G technology and voice calls are primarily switched to low frequency VoLTE and/or VoNR capable cells. The method thus comprises the following steps:

410: Activating a mass event mode in a first cell of a first base station. The first cell uses 4G or 5G technology. In an embodiment, the first cell uses some future technology, such as 6G technology. The first cell serves a first sector. In the mass event mode, steps 420-460 may be performed.

420: Checking if any VoLTE and/or VoNR capable low frequency band cells are available in the first sector. In an embodiment, availability of 2G cells in the first sector may be checked in addition to or as an alternative to checking VoLTE and/or VoNR capable cells. In an embodiment, feasibility of increasing 2G cell capacity in the first sector by adding at least one transceiver (TRX) may also be checked.

430: Responsive to detecting that one or more VoLTE and/or VoNR capable low frequency band cells are available, switching, at least some, voice call connections to VoLTE and/or VoNR connections of the low frequency band cells.

440: Optionally switching a first part of the voice call connections of the first cell to the available VoLTE and/or VoNR connections of the low frequency band cells and switching a second part of the voice call connections of the first cell to 2G cells provided that 2G cells are available in the first sector. In yet another alternative, at least some voice call connections of the first cell are switched to 2G cells. In an embodiment, 2G cell capacity may be increased by adding at least one transceiver (TRX) unit for the first sector prior to switching voice call connections to the 2G cells.

450: Optionally, in response to activating the mass event mode in the first cell, performing the optimization method also for nearby cells and/or activating the mass event mode also for nearby cells.

460: Deactivating the mass event mode.

FIG. 5 shows a flow chart according to an example embodiment. In the example embodiment of FIG. 5, the method of FIG. 3 is applied in a case wherein a first cell uses 4G or 5G technology or some subsequent technology, and wherein voice calls are handled by a primary 3G cell and additional 3G and/or 2G cells, or wherein voice calls are handled by 2G cells. The method thus comprises the following steps:

510: Activating a mass event mode in a first cell of a first base station. In the mass event mode, steps 520-570 may be performed. In an embodiment, the first cell uses 4G technology. In an embodiment, the first cell uses 5G technology. In an embodiment, the first cell uses some future technology, such as 6G technology. In an embodiment, the first cell uses first technology which may refer collectively to 4G and 5G technologies or to a plurality of other technologies.

In an embodiment, inter system handover of voice call connections from 2G technology to other technologies is disabled. In an embodiment, inter system handover of voice call connections from 2G technology to 3G technology is disabled. In an embodiment, inter system handover of voice call connections from 3G technology to the first technology is disabled.

520: Checking how many 3G cells are available in a first sector served by the first cell. In an embodiment, 3G cells available in at least one other sector are checked. The at least one other sector may partially overlap with the first sector.

530: Responsive to detecting that at least two 3G cells are available, switching voice call connections of the users of the first cell to all available 3G cells. This may be implemented by switching circuit switched fallback (CSFB) to point all available 3G cells. Thus, circuit switched calls are switched from one 3G cell to all available 3G cells. In an embodiment, a portion of voice call connections of the users of the first cell are switched to at least some of the available 3G cells. The switching may be performed using circuit switched fallback (CSFB). In an example embodiment, in the mass event mode the first cell handles only data connections and VoLTE calls.

540: Responsive to detecting that less than two 3G cells are available, switching voice call connections of the users of the first cell to 2G cells, or optionally switching a part of the voice call connections to 2G cells and a part of the voice call connections to 3G cell. The switching may be implemented using circuit switched fallback (CSFB). In an embodiment, the 2G cells are serving the first sector. In an embodiment, the 2G cells are serving the at least one other sector of the first base station. In a further embodiment, some of the 2G cell may serve the first sector and some the 2G cells may serve the at least one other sector.

550: Optionally, checking available 2G cell capacity in the first sector, and responsive to detecting that no 2G cells are available, increasing 2G cell capacity by adding at least one transceiver (TRX) unit prior to switching voice call connections of the users of the first cell to 2G cells. The adding at least one TRX unit may be performed by switching on TRX units.

In an embodiment, available 2G cell capacity in the at least one other sector of the first base station is also checked. In an embodiment, 2G cell capacity is increased in the at least one other sector of the first base station.

In an embodiment, the voice call connections are switched to the available 2G cells only if at least 2 or 3 or 4 2G cells are available.

In an example embodiment, a first part of the voice call connections of the first cell are switched to the available 3G cells and a second part of the voice call connections of the first cell are switched to the available 2G cells. A third part of the voice call connections may be handled by the first cell.

560: Optionally, in response to activating the mass event mode in the first cell, performing the optimization method also for nearby cells and/or activating the mass event mode also for nearby cells.

570: Deactivating the mass event mode.

Without in any way limiting the scope, interpretation, or application of the appended claims, a technical effect of one or more of the example embodiments disclosed herein is that speech capacity may be optimized during a high load situation in a mobile network. A further advantage is that low frequency band VoLTE and/or VoNR capacity may be used to optimize call capacity during high load. Furthermore, better functionality of the voice call connections may be ensured due to better coverage of the low frequency band cells. An advantage is also that congesting 3G cells may be avoided due to switching to 2G. A further advantage is that setting up reserve high frequency band cells for high load situations may be avoided due to switching calls to low frequency band cells during said situations.

Any of the afore described methods, method steps, or combinations thereof, may be controlled or performed using hardware; software; firmware; or any combination thereof. The software and/or hardware may be local; distributed; centralized; virtualised; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the solutions of the present disclosure. It is however clear to a person skilled in the art that the present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present disclosure, and not in limitation thereof. Hence, the scope of the present disclosure is only restricted by the appended patent claims.

The invention claimed is:

1. A computer implemented method for controlling call capacity in a mobile network, the method comprising:

activating a mass event mode in a first cell of a first base station, wherein the first cell is a high frequency band cell, and wherein operating in the mass event mode comprises:

checking if any low frequency band cells are available in a first sector served by the first cell; and responsive to detecting that one or more low frequency band cells are available, switching, at least some, voice call connections of users of the first cell to at least some of the available low frequency band cells, wherein the first cell uses 4G or 5G technology and checking if any low frequency band cells are available in the first sector served by the first cell comprises:

checking if any VoLTE and/or VoNR capable low frequency band cells are available in the first sector and responsive to detecting that one or more VoLTE and/or VoNR capable low frequency band cells are available, the switching of at least some voice call connections of the users of the first cell to at least some of the available low frequency band cells comprises:

responsive to detecting that one or more VoLTE and/or VoNR capable low frequency band cells are available, switching, at least some, voice call connections to VoLTE and/or VoNR connections of the low frequency band cells; or optionally switching a first part of the voice call connections of the first cell to VoLTE and/or VoNR connections of the available low frequency band cells and a second part of the voice call connections of the first cell to one or more 2G cells.

2. The method of claim 1, wherein the low frequency band comprises frequencies below or equal to 1000 MHz, and the high frequency band comprises frequencies over 1000 MHz.

3. The method of claim 1, wherein the low frequency band comprises frequencies 700-900 MHZ, and the high frequency band comprises frequencies equal to or over 1800 MHZ.

4. The method of claim 1, wherein checking if any low frequency band cells are available in the first sector served by the first cell comprises:

checking how many 3G cells are available in the first sector;

responsive to detecting that one or more low frequency band cells are available, switching, at least some, voice call connections of the users of the first cell to at least some of the available low frequency band cells comprises:

responsive to detecting that two or more 3G cell are available, switching, at least some, voice call connections of the users of the first cell to at least some of the available 3G cells; and responsive to detecting that less than two 3G cells are available, switching voice call connections of the users of the first cell to 2G cells; or optionally switching a first part of the voice call connections of the first cell to the available 3G cells and a second part of the voice call connections of the first cell to 2G cells.

5. The method of claim 1, wherein switching voice call connections of the users of the first cell to 2G cells comprises:

checking available 2G cell capacity in the first sector; and responsive to detecting that no 2G cells are available, increasing 2G cell capacity by adding at least one transceiver unit prior to switching voice call connections of the users of the first cell to 2G cells.

6. The method of claim 1, wherein the voice call connections are switched to the available 2G cells only if at least 2 or 3 or 4 2G cells are available.

7. The method of claim 1, further comprising:

disabling inter system handover of voice call connections from 2G technology to other technologies when operating in the mass event mode; and/or disabling inter system handover of voice call connections from 2G technology to 3G technology when operating in the mass event mode; and/or disabling inter system handover of voice call connections from 3G technology to 4G and/or 5G technologies when operating in the mass event mode.

8. The method of claim 4, wherein switching voice call connections of the users of the first cell to 2G cells comprises:

checking available 2G cell capacity in the first sector; and responsive to detecting that no 2G cells are available, increasing 2G cell capacity by adding at least one transceiver unit prior to switching voice call connections of the users of the first cell to 2G cells.

9. The method of claim 4, wherein the voice call connections are switched to the available 2G cells only if at least 2 or 3 or 4 2G cells are available.

10. The method of claim 4, further comprising:

disabling inter system handover of voice call connections from 2G technology to other technologies when operating in the mass event mode; and/or disabling inter system handover of voice call connections from 2G technology to 3G technology when operating in the mass event mode; and/or disabling inter system handover of voice call connections from 3G technology to 4G and/or 5G technologies when operating in the mass event mode.

11. The method of claim 1, wherein in response to activating the mass event mode in the first cell, activating a mass event mode also in:

other high frequency band cells of the first base station; and/or high frequency band cells of neighbouring base stations; and/or high frequency band cells serving a selected area; and/or high frequency band cells of base stations in a selected area.

12. The method of claim 1, wherein the mass event mode is activated in response to detecting that:

a count of users of the first cell exceeds a pre-set activation threshold;

a pre-set activation time occurs; or a mass event mode is activated in a nearby cell.

13. The method of claim 12, wherein the pre-set activation threshold is 100-500.

14. The method of claim 1, wherein the mass event mode is deactivated in response to detecting that:

the count of users in the first cell subceeds a pre-set deactivation threshold for a pre-set duration; or a pre-set termination time occurs.

15. The method of claim 14, wherein the pre-set deactivation threshold is smaller than or equal to the pre-set activation threshold and the pre-set duration is 0.5-2 days.

16. An apparatus comprising:

a processor; and a memory including computer program code; the memory and the computer program code configured to, with the processor, cause the apparatus to activate a mass event mode in a first cell of a first base station, wherein the first cell is a high frequency band cell, and wherein operating in the mass event mode comprises:

to check if any low frequency band cells are available in a first sector served by the first cell; and responsive to detecting that one or more low frequency band cells are available, to switch, at least some, voice call connections of users of the first cell to at least some of the available low frequency band cells, wherein the first cell uses 4G or 5G technology and checking if any low frequency band cells are available in the first sector served by the first cell comprises:

checking if any VoLTE and/or VoNR capable low frequency band cells are available in the first sector and responsive to detecting that one or more VoLTE and/or VoNR capable low frequency band cells are available, the switching of at least some voice call connections of the users of the first cell to at least some of the available low frequency band cells comprises:

responsive to detecting that one or more VoLTE and/or VoNR capable low frequency band cells are available, switching, at least some, voice call connections to VoLTE and/or VoNR connections of the low frequency band cells; or optionally switching a first part of the voice call connections of the first cell to VoLTE and/or VoNR connections of the available low frequency band cells and a second part of the voice call connections of the first cell to one or more 2G cells.

17. A computer program comprising computer executable program code on a non-transitory computer readable medium which when executed by a processor causes an apparatus to perform:

activating a mass event mode in a first cell of a first base station, wherein the first cell is a high frequency band cell, and wherein operating in the mass event mode comprises:

checking if any low frequency band cells are available in a first sector served by the first cell; and responsive to detecting that one or more low frequency band cells are available, switching, at least some, voice call connections of users of the first cell to at least some of the available low frequency band cells, wherein the first cell uses 4G or 5G technology and checking if any low frequency band cells are available in the first sector served by the first cell comprises:

checking if any VoLTE and/or VoNR capable low frequency band cells are available in the first sector and responsive to detecting that one or more VoLTE and/or VoNR capable low frequency band cells are available, the switching of at least some voice call connections of the users of the first cell to at least some of the available low frequency band cells comprises:

responsive to detecting that one or more VoLTE and/or VoNR capable low frequency band cells are available, switching, at least some, voice call connections to VoLTE and/or VoNR connections of the low frequency band cells; or optionally switching a first part of the voice call connections of the first cell to VoLTE and/or VoNR connections of the available low frequency band cells and a second part of the voice call connections of the first cell to one or more 2G cells.

* * * * *